(12) United States Patent
Saldamli et al.

(10) Patent No.: US 9,390,271 B2
(45) Date of Patent: Jul. 12, 2016

(54) VECTORIAL PRIVATE EQUALITY TESTING

(71) Applicant: SAMSUNG ELECTRONICS CO., LTD., Suwon, Gyeonggi-Do (KR)

(72) Inventors: Gokay Saldamli, San Jose, CA (US); Richard Chow, Sunnyvale, CA (US); Hongxia Jin, San Jose, CA (US); Bart Knijnenburg, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 439 days.

(21) Appl. No.: 13/907,783

(22) Filed: May 31, 2013

(65) Prior Publication Data

US 2014/0041039 A1 Feb. 6, 2014

Related U.S. Application Data

(60) Provisional application No. 61/680,208, filed on Aug. 6, 2012.

(51) Int. Cl.
*G06F 21/60* (2013.01)
*G06F 21/62* (2013.01)
*H04L 9/00* (2006.01)

(52) U.S. Cl.
CPC ............ *G06F 21/60* (2013.01); *G06F 21/6254* (2013.01); *H04L 9/008* (2013.01)

(58) Field of Classification Search
CPC ....... G06F 21/60; H04L 9/008; H04L 9/0861; H04L 9/0872
USPC ............................................. 726/26; 380/28
See application file for complete search history.

(56) References Cited

U.S. PATENT DOCUMENTS

2003/0204732 A1 10/2003 Audebert et al.
2006/0245587 A1 11/2006 Pinkas et al.
(Continued)

FOREIGN PATENT DOCUMENTS

WO 2012048347 A1 4/2012

OTHER PUBLICATIONS

Lipmaa, Helger—Verifiable Homomorphic Oblivious Transfer and Private Equality Test. Helsinki University of Technology. Oct. 2003. http://www.researchgate.net/profile/Helger_Lipmaa/publication/2918911_Verifiable_Homomorphic_Oblivious_Transfer_and_Private_Equality_Test/links/0912f51368902a6ada000000.pdf.*

(Continued)

*Primary Examiner* — Robert Leung
*Assistant Examiner* — Ngoc D Nguyen
(74) *Attorney, Agent, or Firm* — Sherman IP LLP; Kenneth L. Sherman; Hemavathy Perumal

(57) ABSTRACT

A system for equality testing, the system comprising a first client device including a first private data unit, a second client device including a second private data unit, and a server. The server receives a first obfuscated data unit corresponding to the first private data unit from the first client device, and a second obfuscated data unit corresponding to the second private data unit from the second client device. The server performs a vector calculation based on the first and second obfuscated data units to generate a combination of the first and second obfuscated data units. The server sends the combination to the first client device. The first client device is configured to determine whether the first private data unit is equal to the second private data unit based on the combination.

28 Claims, 10 Drawing Sheets

(56) References Cited

U.S. PATENT DOCUMENTS

2007/0081664 A1* 4/2007 Avidan et al. .................. 380/28
2010/0246812 A1 9/2010 Rane et al.

OTHER PUBLICATIONS

Narayanan, A. et al., "Location Privacy via Private Proximity Testing", NDSS, 2011, pp. 1-17, United States.

Atallah, M.J. et al., "Secure Mult-Party Computational Geometry", International Workshop on Algorithms and Data Structures, 2001, pp. 1-15, Springer-Verlag, United States.

Fagin, R. et al, "Comparing Information Without Leaking It", Communications of the ACM, May 1996, pp. 1-19, vol. 39, Issue 5, United States.

Yao, A.C., "How to Generate and Exchange Secrets", Proceedings of the 27th Annual Symposium on Foundations of Computer Science, Oct. 27-29, 1986, pp. 162-167, IEEE, United States.

Yao, A.C., "Protocols for Secure Computations", Proceedings of the 23rd Annual Symposium on Foundations of Computer Science (SFCS'08), Nov. 3-5, 1982, pp. 160-164, IEEE, United States.

Jakobsson, M. et al., "Proving Without Knowing: On Oblivious, Agnostic and Blindfolded Provers", Lecture Notes in Computer Science (CRYPTO '96), 1996, pp. 186-200, Vo. 1109, United States.

International Search Report and Written Opinion dated Dec. 2, 2013 for International Application No. PCT/KR2013006932 from Korean Intellectual Property Office, pp. 1-10, Seo-gu, Daejeon, Republic of Korea.

Narayanan, A. et al., "Location Privacy via Private Proximity Testing", Proceedings of the 2011 Network and Distributed System Security Symposium, Feb. 6-9, 2011, pp. 1-17, Internet Society, United States.

* cited by examiner

VECTORIAL PRIVATE EQUALITY TESTING

CROSS-REFERENCE TO RELATED APPLICATIONS

This application claims the priority benefit of U.S. Provisional Patent Application Ser. No. 61/680,208, filed on Aug. 6, 2012, incorporated herein by reference.

TECHNICAL FIELD

One or more embodiments relate generally to equivalence testing, and in particular to equivalence testing using vectors.

BACKGROUND

Equivalence testing has many useful applications. For example, equivalence testing is used to determine proximity in location-based services. To preserve location privacy, equality testing protocols utilize costly encryption schemes, such as public-key encryption, homomorphic encryption, or cryptographic primitives.

SUMMARY

One embodiment provides a system for equality testing, the system comprising a first client device including a first private data unit, a second client device including a second private data unit, and a server. The server receives a first obfuscated data unit corresponding to the first private data unit from the first client device, and a second obfuscated data unit corresponding to the second private data unit from the second client device. The server performs a vector calculation based on the first and second obfuscated data units to generate a combination of the first and second obfuscated data units. The server sends the combination to the first client device. The first client device is configured to determine whether the first private data unit is equal to the second private data unit based on the combination.

One embodiment provides a method for equality testing, the method comprising receiving a first obfuscated data unit from a first client device and a second obfuscated data unit from a second client device. The first obfuscated data unit corresponds to a first private data unit for the first client device. The second obfuscated data unit corresponds to a second private data unit for the second client device. The server performs a vector calculation based on the first and second obfuscated data units to generate a combination of the first and second obfuscated data units. The server sends the combination to the first client device. The first client device determines whether the first private data unit is equal to the second private data unit based on the combination.

One embodiment provides a device for equality testing, the device comprising a computation unit configured to generate a first obfuscated data unit corresponding to a first private data unit for the device. The device further comprises a communication unit configured to send to a server the first obfuscated data unit, and receive from the server a combination of the first obfuscated data unit and a second obfuscated data unit corresponding to a second private data unit for a different device. The computation unit is further configured to determine whether the first private data unit is equal to the second private data unit based on the combination received.

One embodiment provides a non-transitory computer-readable medium having instructions which when executed on a computer perform a method comprising generating a first obfuscated data unit corresponding to a first private data unit for a first client device, sending to a server the first obfuscated data unit, receiving from the server a combination of the first obfuscated data unit and a second obfuscated data unit corresponding to a second private data unit for a second client device, and determining whether the first private data unit is equal to the second private data unit based on the combination received.

These and other aspects and advantages of one or more embodiments will become apparent from the following detailed description, which, when taken in conjunction with the drawings, illustrate by way of example the principles of one or more embodiments.

BRIEF DESCRIPTION OF THE DRAWINGS

For a fuller understanding of the nature and advantages of one or more embodiments, as well as a preferred mode of use, reference should be made to the following detailed description read in conjunction with the accompanying drawings, in which.

DETAILED DESCRIPTION

Figure 1:
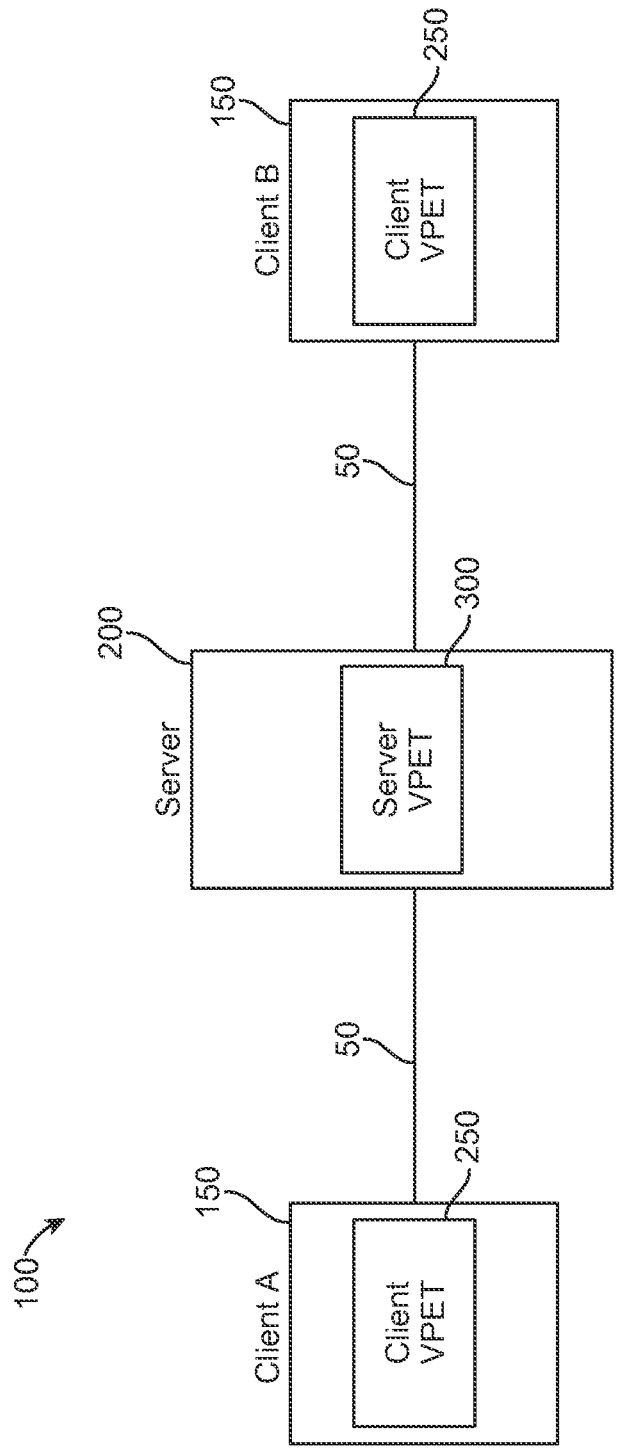
FIG. 1 illustrates a block diagram of a system for vectorial private equality testing, in accordance with an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to equivalence testing, and in particular to equivalence testing using vectors. One embodiment provides a system for equality testing, the system comprising a first client device including a first private data unit, a second client device including a second private data unit, and a server. The server receives a first obfuscated data unit corresponding to the first private data unit from the first client device, and a second obfuscated data unit corresponding to the second private data unit from the second client device. The server performs a vector calculation based on the first and second obfuscated data units to generate a combination of the first and second obfuscated data units. The server sends the combination to the first client device. The first client device is configured to determine whether the first private data unit is equal to the second private data unit based on the combination.

One embodiment provides a method for equality testing, the method comprising receiving a first obfuscated data unit from a first client device and a second obfuscated data unit from a second client device. The first obfuscated data unit corresponds to a first private data unit for the first client device. The second obfuscated data unit corresponds to a second private data unit for the second client device. The server performs a vector calculation based on the first and second obfuscated data units to generate a combination of the first and second obfuscated data units. The server sends the combination to the first client device. The first client device determines whether the first private data unit is equal to the second private data unit based on the combination.

Each obfuscated data unit comprises a vector unit. The combination comprises a dot product of the first and second obfuscated data units.

Each client device is further configured to generate a private vector unit corresponding to the private data unit for the client device, and obfuscate the private vector unit to produce an obfuscated data unit corresponding to the private data unit for the client device.

In one embodiment, the first client device is further configured to determine that the second client device is within proximity of the first client device when the first private data unit is equal to the second private data unit. The first client device is further configured to determine that the second client device is not within proximity of the first client device when the first private data unit is not equal to the second private data unit.

In one embodiment, the first client device and the second client device share an encryption key.

In one embodiment, the first client device obfuscates a private vector unit corresponding to the first private data unit by generating a random vector unit that is perpendicular to the private vector unit, and rotating the random vector unit by a random rotation angle to produce a rotated vector unit, wherein the rotated vector unit is sent to the server.

In one embodiment, the first client device is further configured to perform a vector calculation based on the rotated vector unit and a random vector unit to generate a dot product of the rotated vector unit and the random vector unit, and determine whether the dot product of the rotated vector unit and the random vector unit is equal to the combination received from the server.

In one embodiment, the second client device obfuscates a private vector unit corresponding to the second private data unit by rotating the private vector unit by a random rotation angle to produce a rotated vector unit, scaling the rotated vector unit by a random value to produce a scaled vector unit, and incrementing the scaled vector unit by a random vector unit to produce an incremented vector unit. The incremented vector unit is sent to the server.

In one embodiment, the first private data unit is hidden from the server and the second client device. The second private data unit is hidden from the server and the first client device.

In one embodiment, for each client device, the private vector unit corresponding to the private data unit for the client device is a real-valued vector. In another embodiment, for each client device, the private vector unit corresponding to the private data unit for the client device is an integer-valued vector.

One embodiment provides a device for equality testing, the device comprising a computation unit configured to generate a first obfuscated data unit corresponding to a first private data unit for the device. The device further comprises a communication unit configured to send to a server the first obfuscated data unit, and receive from the server a combination of the first obfuscated data unit and a second obfuscated data unit corresponding to a second private data unit for a different device. The computation unit is further configured to determine whether the first private data unit is equal to the second private data unit based on the combination received.

The device further comprises a vectorization unit configured to generate a private vector unit corresponding to the first private data unit. The computation unit obfuscates the private vector unit to generate the first obfuscated data unit. The combination comprises a dot product of the first and second obfuscated data units.

The computation unit is further configured to determine that the second client device is within proximity of the first client device when the first private data unit is equal to the second private data unit, and determine that the second client device is not within proximity of the first client device when the first private data unit is not equal to the second private data unit.

The device further comprises a pseudorandom generation unit configured to generate a random vector unit, and generate a random rotation angle. The computation unit obfuscates the private vector unit based at least in part on the random vector unit and the random rotation angle.

One embodiment provides a non-transitory computer-readable medium having instructions which when executed on a computer perform a method comprising generating a first obfuscated data unit corresponding to a first private data unit for a first client device, sending to a server the first obfuscated data unit, receiving from the server a combination of the first obfuscated data unit and a second obfuscated data unit corresponding to a second private data unit for a second client device, and determining whether the first private data unit is equal to the second private data unit based on the combination received.

FIG. 1 illustrates a block diagram of a system 100 for vectorial private equality testing, in accordance with an embodiment.

In one embodiment, the system 100 comprises multiple clients 150, such as a first client ("Client A") and a second client ("Client B"). A client 150 represents an electronic device of a communicating party. An electronic device may be an appliance, a personal computer (PC), a television (TV) such as a smart TV, or a mobile device (e.g., a mobile phone such as a smart phone, a laptop computer, etc.).

Each client 150 is configured to establish a connection 50 to a server 200. A connection 50 may be a wireless connection, a wired connection, or a combination of the two.

The server 200 comprises a server-side vectorial private equality testing (VPET) application module 300 configured to facilitate private equality testing between multiple clients 150. Each client 150 comprises a client-side VPET application module 250 configured to communicate with the server 200.

Figure 2:
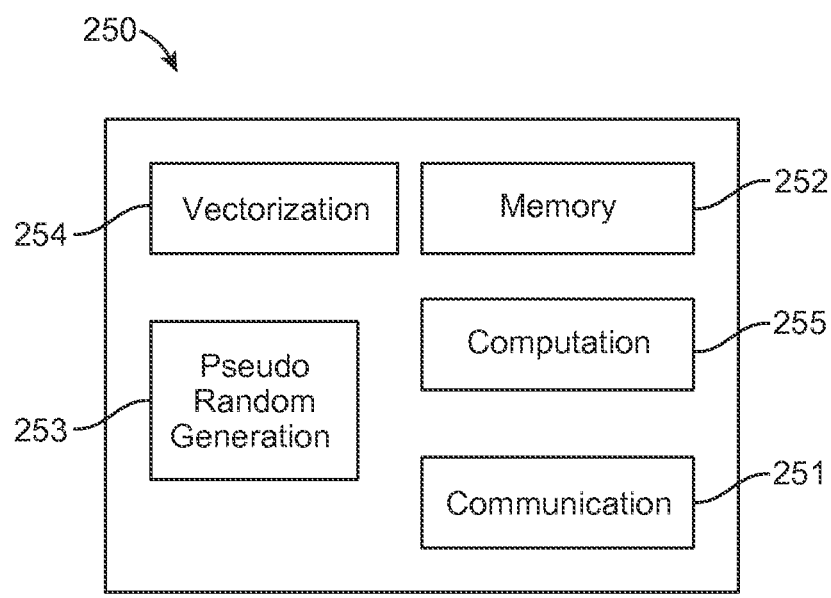
FIG. 2 illustrates a block diagram of a client-side vectorial private equality testing application module, in accordance with an embodiment.

FIG. 2 illustrates a block diagram of a client-side vectorial private equality testing (VPET) application module 250, in accordance with an embodiment. In one embodiment, the client-side VPET application module 250 of a client device 150 comprises a communication unit 251, a memory unit 252, a pseudo random generation (PRG) unit 253, a vectorization unit 254, and a computation unit 255.

The communication unit 251 is configured to receive information from and send information to another entity such as the server 200 or another client device 150. The memory unit 252 is configured to maintain information, such as a corresponding private value (private information unit) v, for the client device 150. For example, the memory unit 252 of Client A maintains a corresponding private value $v_A$, and the memory unit 252 of Client B maintains a corresponding private value $v_B$. A corresponding private value v for a client device 150 may represent a unit of information associated with the client device 150, such as a location of the client device 150, wealth of the client device 150, a score for the client device 150 (e.g., exam score), etc.

As described in detail later herein, the PRG unit 253 is configured to generate pseudo random numbers for private equality testing. The vectorization unit 254 is configured to represent the corresponding private value v for the client device 150 as a d-dimensional vector w (i.e., a private vector unit). The vector w is a multi-dimensional vector, such as a two-dimensional vector representing the latitude and longitude of a location of the client device 150. As described in detail later herein, the vectorization unit 254 of Client A represents the private value $v_A$ as vector $w_A$, and the vectorization unit 254 of Client B represents the private value $v_B$ as vector $w_B$.

Figure 3:
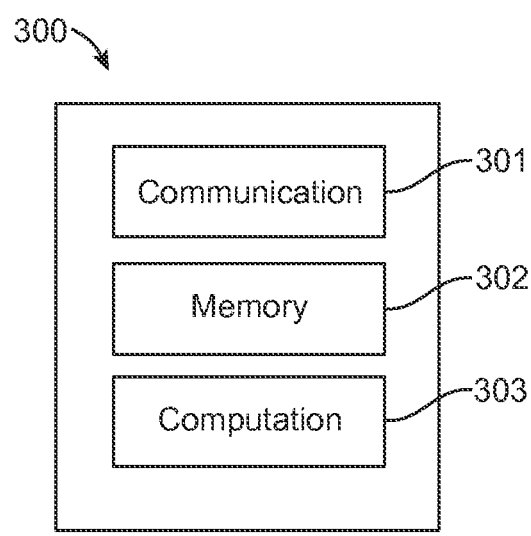
FIG. 3 illustrates a block diagram of a server-side vectorial private equality testing application module, in accordance with an embodiment.

FIG. 3 illustrates a block diagram of a server-side vectorial private equality testing (VPET) application module 300, in accordance with an embodiment. In one embodiment, the server-side VPET application module 300 of the server 200 comprises a communication unit 301, a memory unit 302, and a computation unit 303.

The communication unit 301 is configured to receive information from and send information to another entity such as the server 200 or another client device 150. The memory unit 302 is configured to maintain information, such as each message received from a client device 150.

As described in detail later herein, the computation unit 303 is configured to perform a dot product operation (i.e., an inner product operation).

Figure 4:
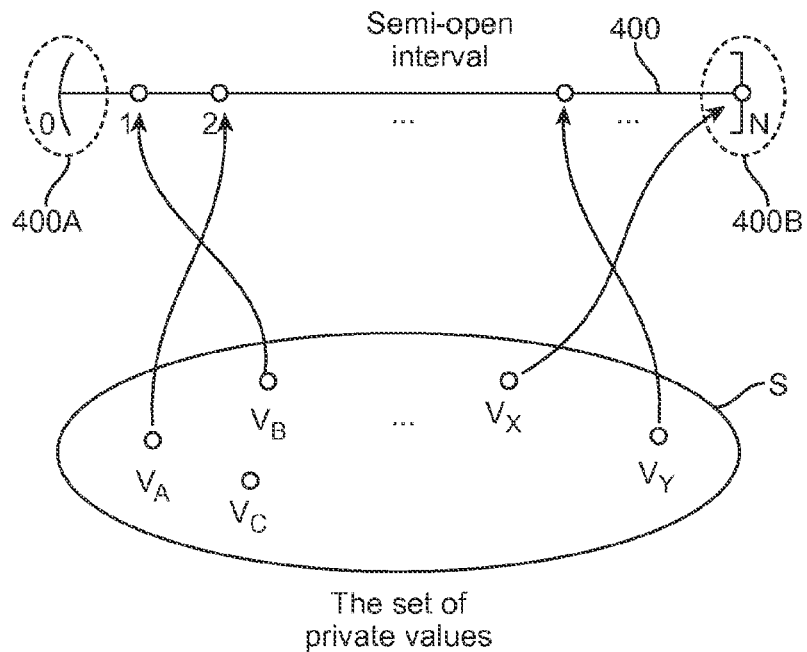
FIG. 4 illustrates a mapping operation, in accordance with an embodiment.

FIG. 4 illustrates a mapping operation, in accordance with an embodiment. The system 100 generates a unique vector w for each private value v for each client device 150. In one embodiment, each vector w is a real-valued vector. In another embodiment, each vector w is an integer-valued vector.

In this specification, let S represent the entire set of private values v in the system 100, and let N represent the total number of private values v in the set S. In one embodiment, if N is not a multiple of 4, additional private values v are added to the set S until N becomes a multiple of 4.

Each private value v in the system 100 is mapped to a natural number of a semi-open interval (0, N]. The semi-open interval (0, N] is represented as a line segment 400 in FIG. 4. A first end 400A of the line segment 400 represents the number 0, and a second end 400B of the line segment 400 represents the number N.

Each private value v in the system 100 is mapped to a natural number of the semi-open interval (0, N]. Specifically, the vectorization unit 254 of each client device 150 assigns a corresponding private value v to a natural number of the semi-open interval (0,N]. For example, as shown in FIG. 4, the vectorization unit 254 of Client A maps the corresponding private value $v_A$ to the number 2, and the vectorization unit 254 of Client B maps the corresponding private value $v_B$ to the number 1.

Figure 5A:
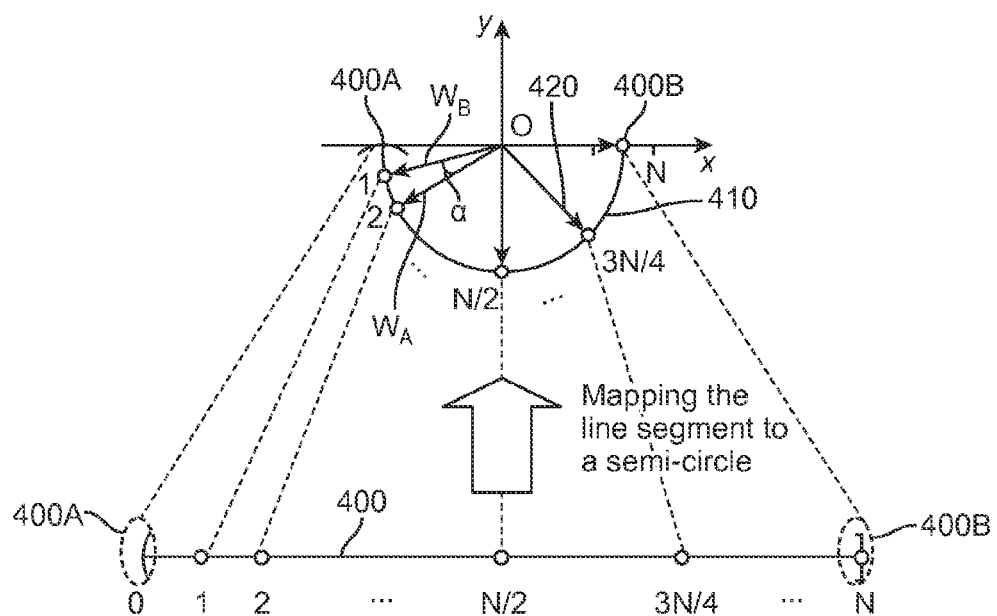
FIG. 5A illustrates a real-valued vectorization operation, in accordance with an embodiment.

FIG. 5A illustrates a real-valued vectorization operation, in accordance with an embodiment. In one embodiment, for a finite set S of private values v, each natural number of the semi-open interval (0, N] is mapped to a point on a semi-circle 410. For example, the first end 400A (i.e., the number 0) and the second end 400B (i.e., the number N) of the line segment 400 are bent into a semi-circle 410 centered at origin O.

Each natural number mapped to a point on the semi-circle 410 may be represented as a vector 420 starting from the origin O and ending on the point on the semi-circle 410. FIG. 5A illustrates the vectors $w_A$ and $w_B$ representing the private values $v_A$ and $v_B$, respectively.

In one embodiment, an angle α between two consecutive vectors 420 (e.g., vectors $w_A$ and $w_B$) is equal to Π/N radians.

Figure 5B:
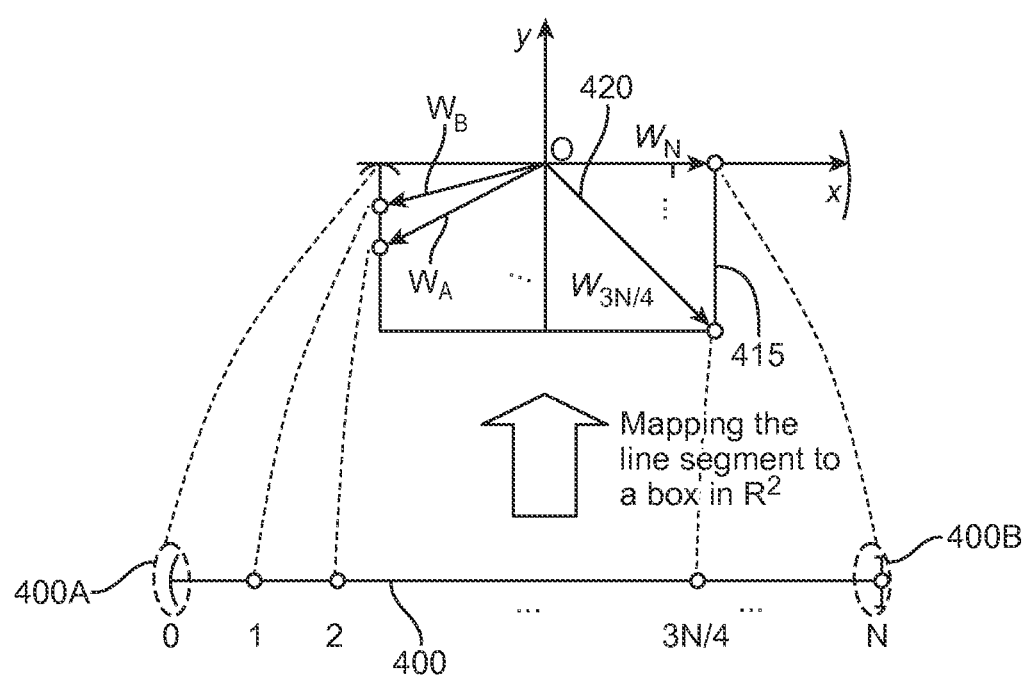
FIG. 5B illustrates an integer-valued vectorization operation, in accordance with an embodiment.

FIG. 5B illustrates an integer-valued vectorization operation, in accordance with an embodiment. In one embodiment, for a finite set S of private values v, each natural number of the semi-open interval (0, N] is mapped to a point on a rectangle box 415 in $R^2$. Each natural number mapped to a point on the rectangle box 415 may be represented as a vector 420 starting from the origin O and ending on the point on the rectangle box 415. FIG. 5B illustrates the vectors $w_A$ and $w_B$ representing the private values $v_A$ and $v_B$, respectively.

In one embodiment, the system 100 utilizes an angle-preserving mapping function R configured to rotate a vector 420 by a random rotation angle θ. The mapping function R is defined only on the vectors 420 and their symmetries with respect to the x-axis. The total number of vectors 420 is 2N, and a random rotation angle θ is an integer value in the semi-open interval (0, 2N].

Figure 6A:
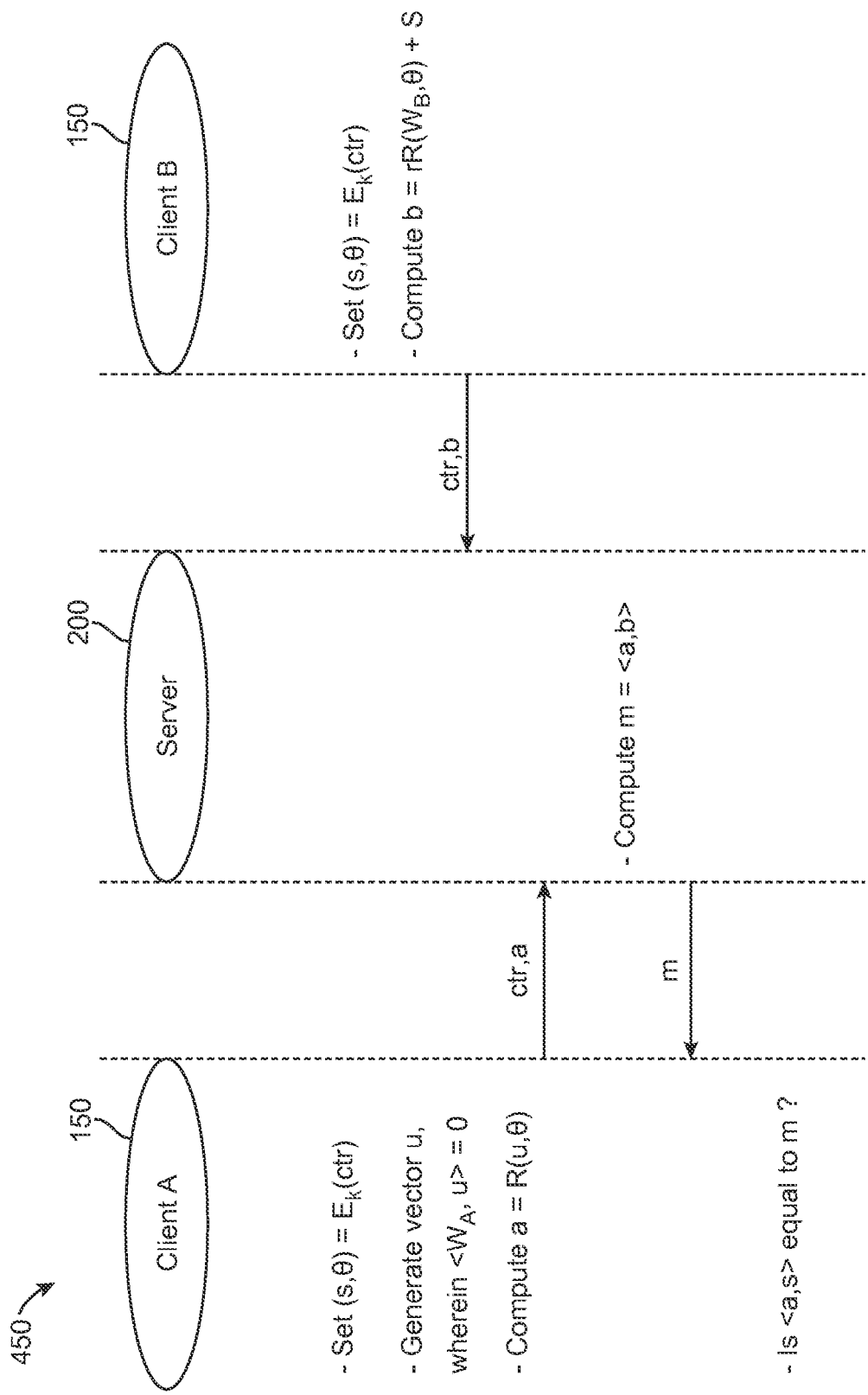
FIG. 6A illustrates a flow diagram representing a vectorial private equality testing protocol, in accordance with an embodiment.

FIG. 6A illustrates a flow diagram 450 representing the VPET protocol, in accordance with an embodiment. As stated above, the vectorization unit 254 of Client A represents the private value $v_A$ for Client A as the vector $w_A$, and the vectorization unit 254 of Client B represents the private value $v_B$ as the vector $w_B$.

In one embodiment, Client A and Client B use a counter ctr for synchronization. In one example implementation, the counter ctr is initialized to zero. Client A increments the counter ctr by one each time the private value $v_A$ changes (e.g., the location of Client A changes). Similarly, Client B increments the counter ctr by one each time the private value $v_B$ changes (e.g., the location of Client B changes).

As stated above, the server-side VPET application module 300 of the server 200 facilitates private equality testing between Client A and Client B. In one embodiment, the memory unit 302 of the server 200 maintains the most recent value of the counter ctr. The communication unit 251 of each Client A, Client B queries the server 200 for the most recent value of the counter ctr.

In one embodiment, Client A and Client B share an encryption key k, wherein the encryption key k is known only to Client A and Client B. The PRG unit 253 of each Client A, Client B implements a pseudorandom function E (e.g., Advanced Encryption Standard (AES)) that is configured to generate pseudorandom values based on the encryption key k and the counter ctr. In one embodiment, the memory unit 252 of each Client A, Client B maintains the encryption key k.

In one embodiment, Client B increments the counter ctr by one before communicating with the server 200. Client A queries the server 200 for the most recent value of the counter ctr before communicating with the server 200. The communication unit 301 of the server 200 communicates the most recent value of the counter ctr when queried.

Each Client A, Client B is configured to generate a pseudorandom vector s and a random rotation angle θ using the pseudorandom function E, the encryption key k, and the counter ctr. In one embodiment, the PRG unit 253 of each Client A, Client B generates the pseudorandom vector s and the random rotation angle θ using relation (1) below:

$$(s,\theta)=E_k(ctr) \quad (1)$$

wherein $E_k(ctr)$ is a pseudorandom value resulting from evaluating the pseudorandom function E at a point equal to the counter ctr using the encryption key k. In one embodiment, the client-side VPET application module 250 of each Client A, Client B parses the pseudorandom value $E_k(ctr)$ to obtain/extract the pseudorandom vector s and the random rotation angle θ.

In one embodiment, the client-side VPET application module 250 of each Client A, Client B sends a message including an obfuscated/blind vector (i.e., obfuscated data unit) to the server 200. Sending an obfuscated/blind vector to the server 200 removes the need to encrypt the message sent to the server 200 (i.e., the server 200 does not need to share an encryption key with either Client A or Client B). Further, sending an obfuscated/blind vector in lieu of an encrypted message ensures that the server 200 is oblivious to the vectors $w_A$ and $w_B$ for Client A and Client B, respectively.

Specifically, the computation unit 255 of Client B generates an obfuscated/blind vector b for the vector $w_B$ using relation (2) below:

$$b=rR(w_B,\theta)+s \quad (2)$$

wherein $R(w_B,\theta)$ is a vector representing the rotation of the vector $w_B$ by the random rotation angle θ, and wherein r represents a random value for scaling the vector $R(w_B,\theta)$. In one embodiment, the PRG unit 253 of Client B generates the random value r. The computation unit 255 of Client B implements the mapping function R and rotates the vector $w_B$ by the random rotation angle θ to generate the vector $R(w_B,\theta)$. The computation unit 255 of Client B then scales the vector $R(w_B,\theta)$ by the random value r to generate vector $rR(w_B,\theta)$, and adds the pseudo random vector s to the vector $rR(w_B,\theta)$ to produce the obfuscated/blind vector b. In one embodiment, the communication unit 251 of Client B communicates a message including the obfuscated/blind vector b and the counter ctr to the server 200.

In one embodiment, the PRG unit 253 of Client A is further configured to generate a random basis vector u having pseudorandom entries $u_1, u_2, \ldots, u_{d-1}$. The random basis vector u is perpendicular (or orthogonal) to the vector $w_A$. As the random basis vector u is perpendicular (or orthogonal) to the vector $w_A$, the dot product (i.e., inner product) between the vector $w_A$ and the random basis vector u (i.e., $<w_A, u>$) is equal to zero.

The computation unit 255 of Client A generates an obfuscated/blind vector for the random basis vector u using relation (3) below:

$$a=R(u,\theta) \quad (3)$$

wherein $R(u,\theta)$ is a vector representing the rotation of the random basis vector u by the random rotation angle θ. The computation unit 255 of Client A implements the mapping function R and rotates the random basis vector u by the random rotation angle θ to generate the obfuscated/blind vector a. In one embodiment, the communication unit 251 of Client A communicates a message including the obfuscated/blind vector a and the counter ctr to the server 200.

The server 200 determines whether the value of the counter ctr included in messages from Client A matches the value of the counter ctr included in messages from Client B. If the value of the counter ctr in the messages from Client A and Client B is the same, the computation unit 302 of the server 200 computes a dot product (i.e., an inner product) of the obfuscated/blind vectors a and b. In this specification, let m represent the dot product (i.e., the inner product) of the obfuscated/blind vectors a and b (i.e., $<a, b>$). The communication unit 301 of the server 200 communicates the dot product (i.e., the inner product) m to Client A.

The computation unit 251 of Client A further computes a dot product $<a, s>$ (i.e., an inner product) representing the dot product of the obfuscated/blind vector a and the pseudorandom vector s. Upon receiving the dot product m from the server 200, the computation unit 251 determines whether the dot product $<a, s>$ is equal to the dot product m. If the dot product $<a, s>$ is equal to the dot product m, Client A concludes that the vectors $w_A$ and $w_B$ are the same (i.e., the private values $v_A$ and $v_B$ are the same). If the dot product $<a, s>$ is not equal to the dot product m, Client A concludes that the vectors $w_A$ and $w_B$ are the different (i.e., the private values $v_A$ and $v_B$ are different). Therefore, Client A will only deduce the value of the private value $v_B$ when the private value $v_B$ is equal to the private value $v_A$. Neither Client A nor the server 200 will be able to deduce the value of the private value $v_B$ when the private value $v_B$ is different from the private value $v_A$.

An expanded form of the dot product m is provided using relation (4) below:

$$\begin{aligned} m &= \langle a, b \rangle \\ &= \langle R(u, \theta), rR(w_B, \theta) + s \rangle \\ &= r\langle R(u, \theta), R(w_B, \theta) \rangle + \langle R(u, \theta), s \rangle \end{aligned} \quad (4)$$

If the vectors $w_A$ and $w_B$ are the same (i.e., the private values $v_A$ and $v_B$ are the same), the vector $R(w_B,\theta)$ is perpendicular to the vector $R(u,\theta)$. When the vector $R(w_B,\theta)$ is perpendicular to the vector $R(u,\theta)$, the dot product $<R(u,\theta), R(w_B,\theta)>$ is equal to zero. When the dot product $<R(u,\theta), R(w_B,\theta)>$ is equal to zero, the dot product m is equal to the vector $<R(u,\theta), s>$. As stated above, the vector $R(u,\theta)$ represents the obfuscated/blind vector a. Therefore, the server 200 communicates the dot product $<a, s>$ to Client A when the vectors $w_A$ and $w_B$ are the same.

Figure 6B:
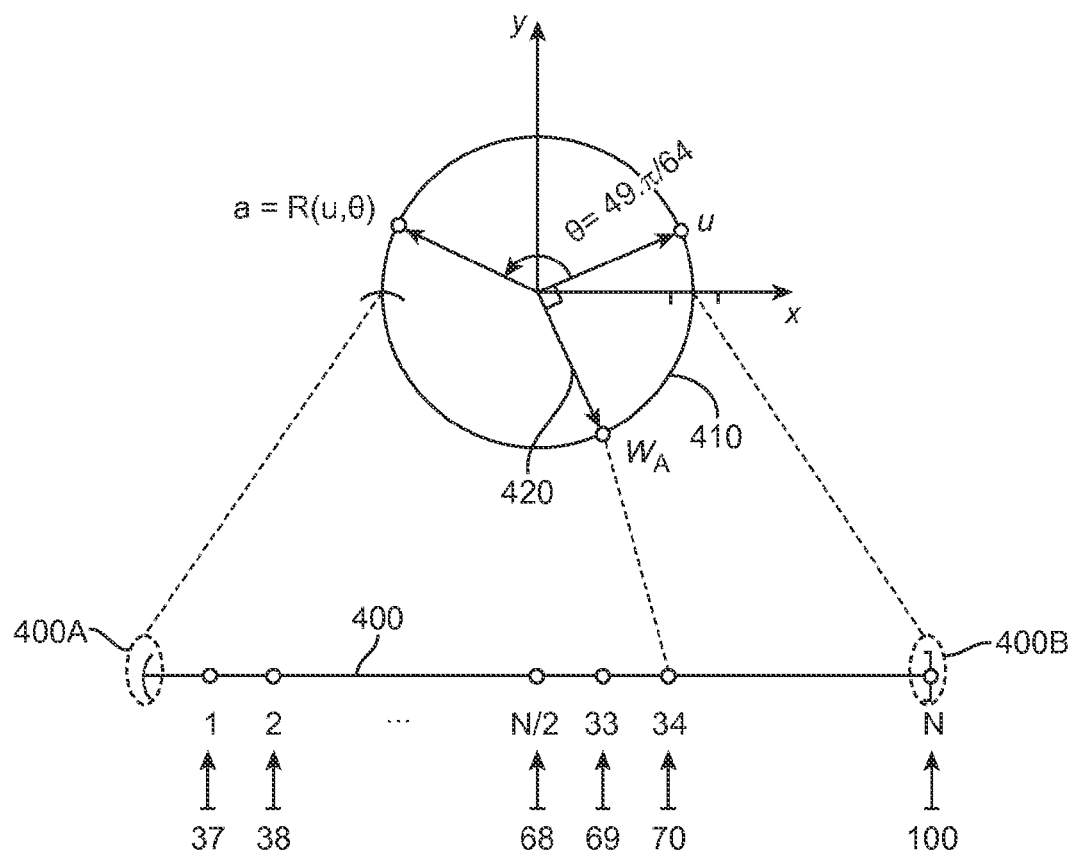
FIG. 6B illustrates an example real-valued vectorization operation for a first client in FIG. 6A, in accordance with an embodiment.

FIG. 6B illustrates an example real-valued vectorization operation for the first client (e.g., Client A) in FIG. 6A, in accordance with an embodiment. In one example, the private value $v_A$ for Client A is 70, wherein each private value v represents an exam score for a math exam. Client A wants to determine whether Client B has the same exam score as Client A for the math exam. Let S represent the finite set of exam scores for the math exam, wherein S=[37, . . . , 100]. Let N represent the total number of discrete exam scores, wherein N=64.

In one embodiment, mapping the set S of exam scores to a semi-circle 410 results in grade increments equal to Π/64 radians (i.e., the angle α between two consecutive vectors 420 is equal to Π/64 radians). As shown in FIG. 6B, the vector $w_A$ representing the private value $v_A$ for Client A is (cos(34Π/64), sin(34Π/64)).

Figure 6C:
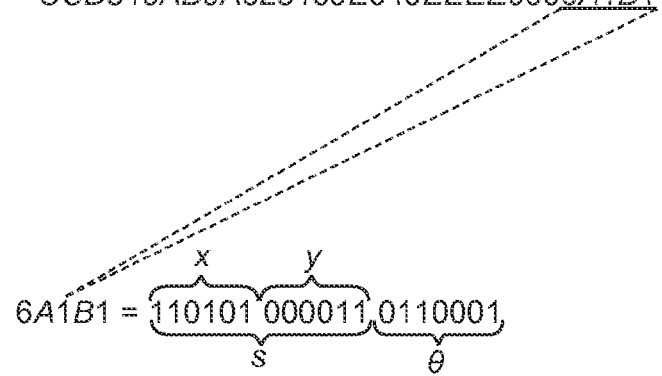
FIG. 6C illustrates an example pseudo random vector and an example random rotation angle for a first and a second client in FIG. 6A, in accordance with an embodiment.

FIG. 6C illustrates an example pseudorandom vector s and an example random rotation angle θ for the first and second clients (e.g., Client A and Client B) in FIG. 6A, in accordance with an embodiment. In one embodiment, Client A and Client B both implement the Advanced Encryption Standard (AES)

as the pseudorandom function E. Client A and Client B share an encryption key k and a counter ctr. Each Client A, Client B generates a pseudorandom vector s and a random rotation angle θ using relation (5) below:

$$(s,\theta) = AES_k(ctr) \\ = CCD819AB9A623189E540EEEE9006A1B1 \quad (5)$$

wherein k=D301E0908128C3B254BDEA4F2C504844, and wherein ctr=3.

In one embodiment, the least significant 19 bits of $AES_k(ctr)$ is used to set the random vector s and the random rotation angle θ. As shown in FIG. 6C, the least significant 19 bits of $AES_k(ctr)$ is the hexadecimal sequence 6A1B1 which represents the binary sequence 1101010000110110001. The random rotation angle θ is set to a portion of the binary sequence, and an x component and a y component of the random vector s are set to the remaining portions of the binary sequence. For example, the random rotation angle θ=49Π/64, and the random vector s=(x,y)=(−21,3), wherein x and y are each represented by a 6-bit sign-magnitude.

If the private value $v_B$ for Client B is also equal to 70, the vector $w_B$ representing the private value $v_B$ for Client B is (cos(34Π/64), sin(34Π/64)). Client B computes $R(w_B,\theta)$ using relation (6) below:

$$R(w_B, \theta) = (\cos((34+49)\Pi/64), \sin((34+49)\Pi/64)) \quad (6)$$
$$= (\cos(83\Pi/64), \sin(83\Pi/64))$$
$$\approx (-0.5956, -0.8032)$$

If a random value r for scaling the vector $R(w_B, \theta)$ is set to 7, Client B generates an obfuscated/blind vector b for the vector $w_B$ using relation (7) below:

$$b = rR(w_B, \theta) + s \quad (7)$$
$$= 7(-0.5956, -0.8032) + (-3, 21)$$
$$\approx (-7.1698, 15.3775)$$

Client A computes a random basis vector u that is perpendicular to the vector $w_A$ by adding Π/2 to $W_A$. Specifically, Client A computes the random basis vector u using relation (8) below:

$$u = (\cos((34+32)\Pi/64), \sin((34+32)\Pi/64)) \quad (8)$$
$$= (\cos(66\Pi/64), \sin(66\Pi/64))$$

Client A generates an obfuscated/blind vector a for the vector $w_a$ using relation (9) below:

$$a = R(u, \theta) \quad (9)$$
$$= (\cos((66+49)\Pi/64), \sin((66+49)\Pi/64))$$
$$= (\cos(115\Pi/64), \sin(115\Pi/64))$$
$$\approx (0.8032, -0.5956)$$

The server 200 computes the dot product m using relation (10) below:

$$m = \langle a, b \rangle \quad (10)$$
$$= \langle (0.8032, -0.5956), (-7.1698, 15.3775) \rangle$$
$$= -7.1698(0.8032) + 15.3775(-0.5956)$$
$$= -14.9191$$

Client computes the dot product <a, s> using relation (11) below:

$$\langle a, s \rangle = \langle (0.8032, -0.5956), (-3, 21) \rangle \quad (11)$$
$$= -3(0.032) + 21(-0.5956)$$
$$= -14.9191$$

As the dot product <a, s> is equal to the dot product m, Client A determines that the private value $v_B$ is equal to the private value $v_A$.

Figure 7:
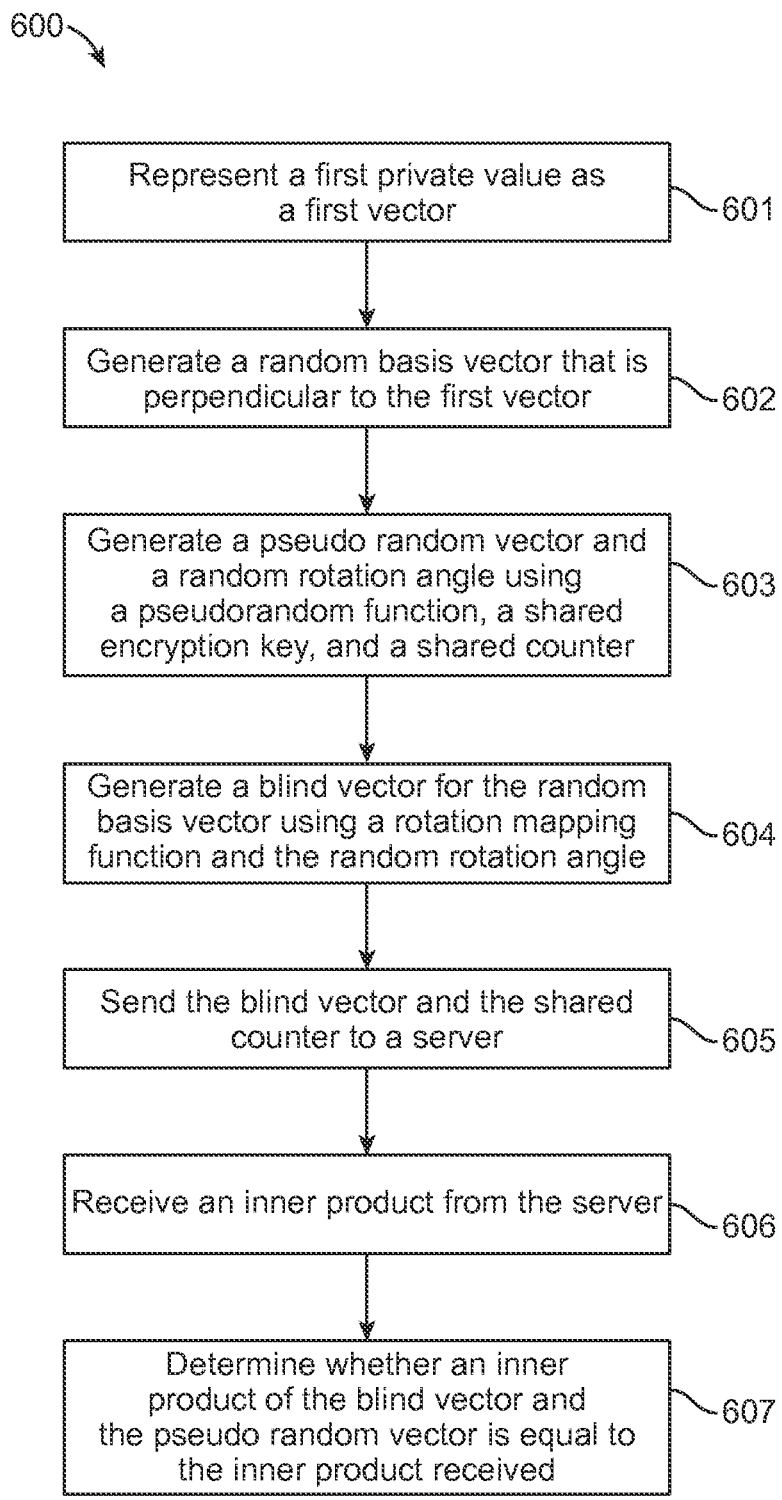
FIG. 7 illustrates an example flow chart for a first client in FIG. 6A, in accordance with an embodiment.

FIG. 7 illustrates an example flow chart 600 for the first client (i.e., Client A) in FIG. 6A, in accordance with an embodiment. In process block 601, the first private value is represented as a first vector. In process block 602, a random basis vector perpendicular to the first vector is generated. In process block 603, a pseudorandom vector and a random rotation angle are generated using a pseudorandom function, a shared encryption key, and a shared counter. In process block 604, a blind vector for the random basis vector is generated using a rotation mapping function and the random rotation angle. In process block 605, the blind vector and the shared counter are sent to a server facilitating private equality testing between the first client and the second client. In process block 606, an inner product (i.e., a dot product) is received from the server. In process block 607, determine whether an inner product (i.e., a dot product) of the blind vector and the pseudorandom vector is equal to the inner product received.

Figure 8:
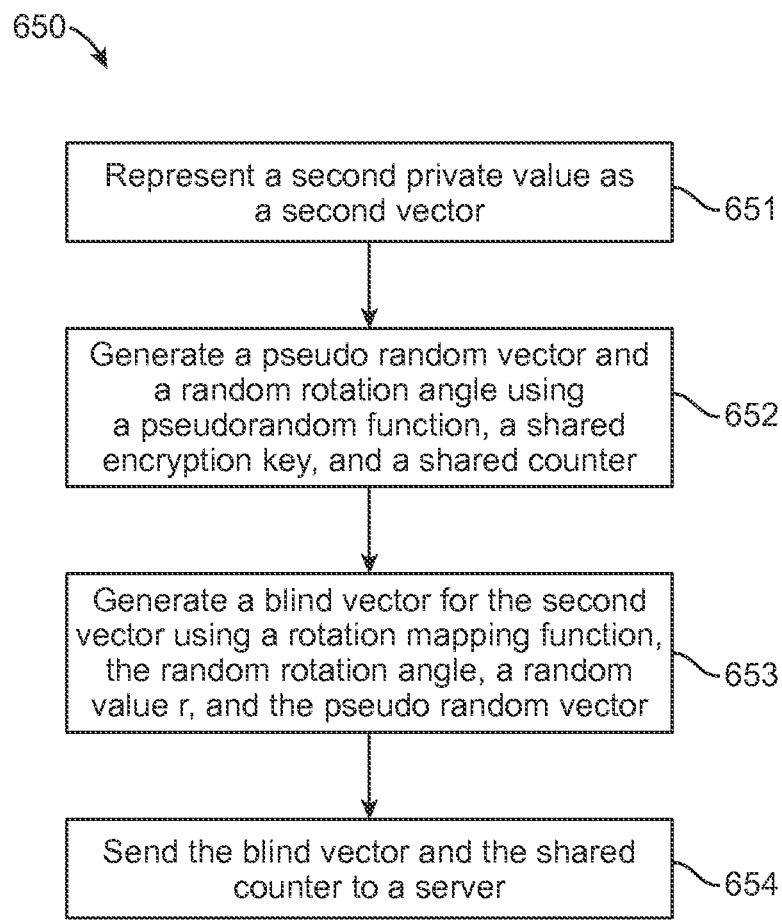
FIG. 8 illustrates an example flow chart for a second client in FIG. 6A, in accordance with an embodiment.

FIG. 8 illustrates an example flow chart 650 for the second client (i.e., Client B) in FIG. 6A, wherein the second client generates a blind vector for a second private value for the second client, in accordance with an embodiment. In process block 651, the second private value is represented as a second vector. In process block 652, a pseudorandom vector and a random rotation angle are generated using a pseudorandom function, a shared encryption key, and a shared counter. In process block 653, a blind vector for the second vector is generated using a rotation mapping function, the random rotation angle, a random value, and the pseudorandom vector. In process block 654, the blind vector and the shared counter are sent to a server facilitating private equality testing between a first client and the second client.

Figure 9:
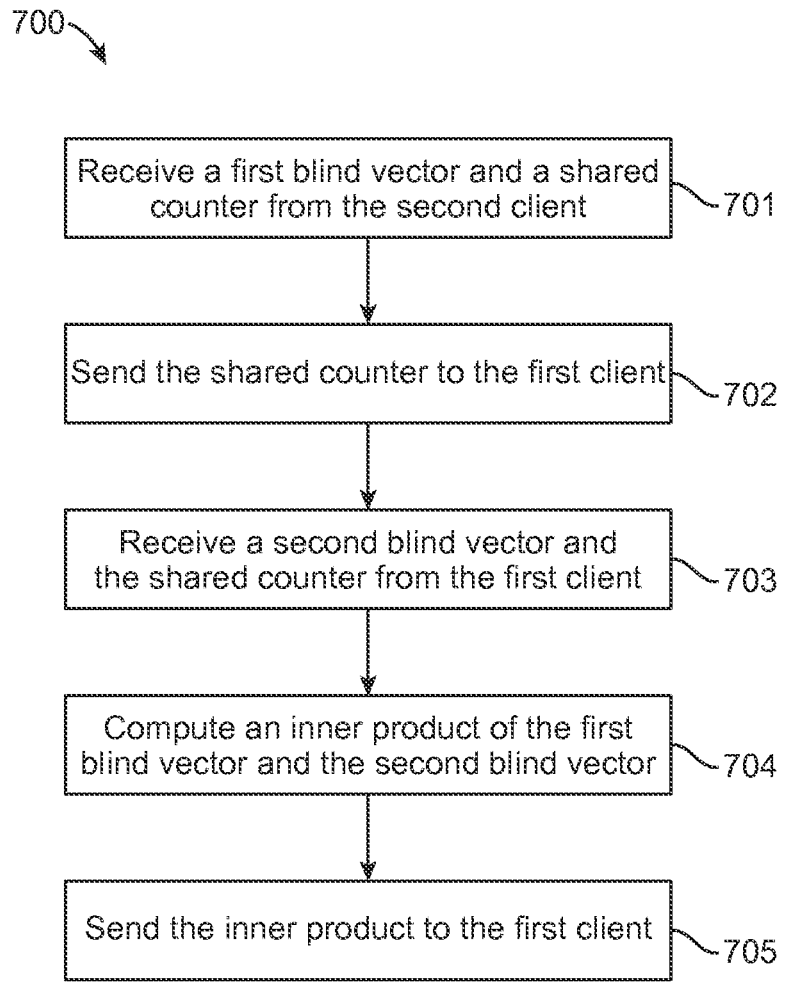
FIG. 9 illustrates an example flow chart for a server in FIG. 6A, in accordance with an embodiment.

FIG. 9 illustrates an example flow chart 700 for the server in FIG. 6A, in accordance with an embodiment. In process block 701, a first blind vector and a shared counter is received from the second client. In process block 702, the shared counter is sent to the first client. In process block 703, a second blind vector and the shared counter is received from the first client. In process block 704, an inner product (i.e., a dot product) of the first blind vector and the second blind vector is computed. In process block 705, the inner product is sent to the first client.

Figure 10:
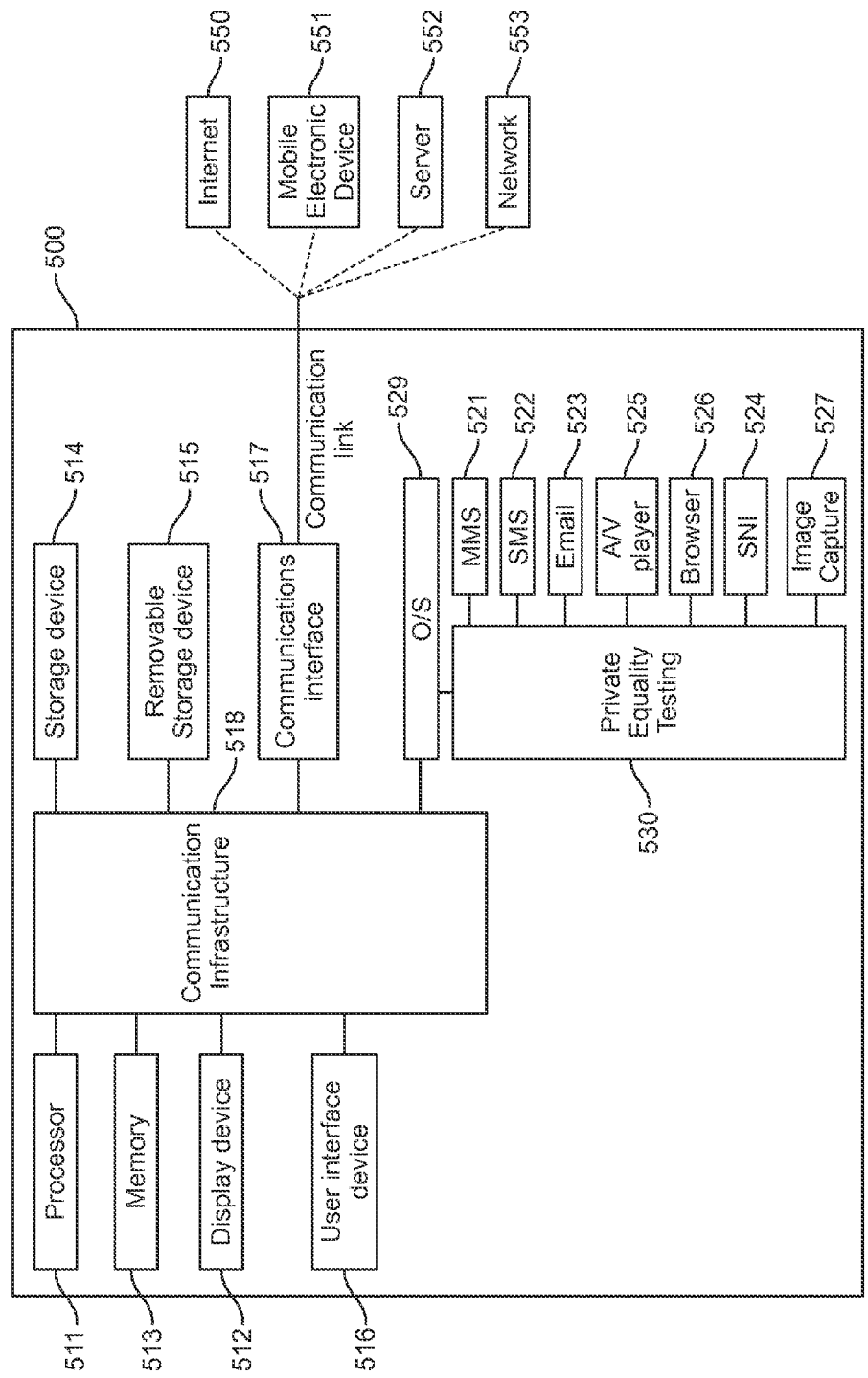
FIG. 10 is a high-level block diagram showing an information processing system comprising a computing system implementing an embodiment.

FIG. 10 is a high-level block diagram showing an information processing system comprising a computing system 500 implementing an embodiment. The system 500 includes one or more processors 511 (e.g., ASIC, CPU, etc.), and can further include an electronic display device 512 (for displaying graphics, text, and other data), a main memory 513 (e.g., random access memory (RAM)), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as WiFi, Cellular), a network interface (such as an Ethernet card), a communications port, or a PCMCIA slot and card). The communication interface 517 allows software and data to be transferred between the computer system and external devices and/or networks, such as the Internet 550, a mobile electronic device 551, a server 552, and a network 553. The system 500 further includes a communications infrastructure 518 (e.g., a communications bus, cross-over bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

The system 500 may further include application modules as MMS module 521, SMS module 522, email module 523, social network interface (SNI) module 524, audio/video (AV) player 525, web browser 526, image capture module 527, etc.

The system 500 further includes a private equality testing module 530 for private equality testing as described herein, according to an embodiment. In one embodiment, the private equality testing module 530 along with an operating system 529 may be implemented as executable code residing in a memory of the system 500. In another embodiment, the private equality testing module 530 along with the operating system 529 may be implemented in firmware.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said architecture can take the form of an entirely hardware embodiment, an entirely software embodiment or an embodiment containing both hardware and software elements.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of one or more embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though embodiments have been described with reference to certain versions thereof; however, other versions are possible. Therefore, the spirit and scope of the appended claims should not be limited to the description of the preferred versions contained herein.

What is claimed is:

1. A system for equality testing, the system comprising:
one or more processors; and
a non-transitory processor-readable memory device storing instructions that when executed by the one or more processors cause the one or more processors to perform operations including:
receiving a first obfuscated data unit corresponding to a first private data unit from a first client device;
receiving a second obfuscated data unit corresponding to a second private data unit from a second client device;
performing a vector calculation based on the first and second obfuscated data units to generate a combination of the first and second obfuscated data units; and sending the combination to the first client device for determination of whether the first private data unit is equal to the second private data unit based on the combination;

wherein each obfuscated data unit corresponding to each private data unit represents an obfuscation of a private vector unit corresponding to the private data unit based on a rotation mapping function and a random rotation angle; and wherein the first private data unit and the second private data unit represent one of similar locations, similar wealth, or similar scores upon determining the first private data unit is equal to the second private data unit.

2. The system of claim 1, wherein:
each obfuscated data unit comprises a vector unit; and
the combination comprises a dot product of the first and second obfuscated data units.

3. The system of claim 1, wherein:
the first private data unit and the second private data unit represent one of different locations, different wealth, or different scores upon determining the first private data unit is not equal to the second private data unit.

4. The system of claim 1, wherein:
the first client device and the second client device share an encryption key.

5. The system of claim 2, wherein:
the first obfuscated data unit corresponding to the first private data unit represents an obfuscation of a first private vector unit corresponding to the first private data unit based on the rotation mapping function and the random rotation angle;
the obfuscation of the first private vector unit comprises applying the rotation mapping function to a random vector unit that is perpendicular to the first private vector unit to rotate the random vector unit by the random rotation angle to produce a rotated vector unit; and
the first obfuscated data unit comprises the rotated vector unit.

6. The system of claim 2, wherein:
the second obfuscated data unit corresponding to the second private data unit represents an obfuscation of a second private vector unit corresponding to the second private data unit based on the rotation mapping function and the random rotation angle;
the obfuscation of the second private vector unit comprises applying the rotation mapping function to the second private vector unit to rotate the second private vector unit by the random rotation angle to produce a rotated vector unit, scaling the rotated vector unit by a random value to produce a scaled vector unit, and incrementing the scaled vector unit by a random vector unit to produce an incremented vector unit; and
the second obfuscated date unit comprises the incremented vector unit.

7. The system of claim 5, wherein:
the first private data unit is equal to the second private data unit when a dot product of the rotated vector unit and the random vector unit is equal to the combination.

8. The system of claim 1, wherein:
the first private data unit is hidden from the system and the second client device; and the second private data unit is hidden from the system and the first client device.

9. The system of claim 1, wherein:
each private vector unit corresponding to each private data unit is a real-valued vector.

10. The system of claim 1, wherein:
each private vector unit corresponding to each private data unit is an integer-valued vector.

11. A method for equality testing, the method comprising:
at a server including at least one hardware processor:
receiving a first obfuscated data unit from a first client device, wherein the first obfuscated data unit corresponds to a first private data unit for the first client device;
receiving a second obfuscated data unit from a second client device, wherein the second obfuscated data unit corresponds to a second private data unit for the second client device;
performing a vector calculation based on the first and second obfuscated data units to generate a combination of the first and second obfuscated data units; and
sending the combination to the first client device for determination of whether the first private data unit is equal to the second private data unit based on the combination;
wherein each obfuscated data unit corresponding to each private data unit represents an obfuscation of a private vector unit corresponding to the private data unit based on a rotation mapping function and a random rotation angle; and
wherein the first private data unit and the second private data unit represent one of similar locations, similar wealth, or similar scores upon determining the first private data unit is equal to the second private data unit.

12. The method of claim 11, wherein:
each obfuscated data unit comprises a vector unit; and the combination comprises a dot product of the first and second obfuscated data units.

13. The method of claim 11, wherein:
the first private data unit and the second private data unit represent one of different locations, different wealth, or different scores upon determining the first private data unit is not equal to the second private data unit.

14. The method of claim 11, wherein:
the first client device and the second client device share an encryption key.

15. The method of claim 12, wherein:
the first obfuscated data unit corresponding to the first private data unit represents an obfuscation of a first private vector unit corresponding to the first private data unit based on the rotation mapping function and the random rotation angle;
the obfuscation of the first private vector unit comprises applying the rotation
mapping function to a random vector unit that is perpendicular to the first private vector unit to rotate the random vector unit by the random rotation angle to produce a rotated vector unit; and
the first obfuscated data unit comprises the rotated vector unit.

16. The method of claim 12, wherein:
the second obfuscated data unit corresponding to the second private data unit represents an obfuscation of a second private vector unit corresponding to the second private data unit based on the rotation mapping function and the random rotation angle;
the obfuscation of the second private vector unit comprises applying the rotation mapping function to the second private vector unit to rotate the second private vector unit by the random rotation angle to produce a rotated vector unit, scaling the rotated vector unit by a random value to produce a scaled vector unit, and incrementing the scaled vector unit by a random vector unit to produce an incremented vector unit; and the second obfuscated date unit comprises the incremented vector unit.

17. The method of claim 15, wherein: the first private data unit is equal to the second private data unit when a dot product of the rotated vector unit and the random vector unit is equal to the combination.

18. The method of claim 11, wherein:
the first private data unit is hidden from the server and the second client device; and
the second private data unit is hidden from the server and the first client device.

19. The method of claim 11, wherein:
each private vector unit corresponding to each private data unit is a real-valued vector.

20. The method of claim 11, wherein:
each private vector unit corresponding to each private data unit is an integer-valued vector.

21. A device for equality testing, the device comprising:
one or more processors; and
a non-transitory processor-readable memory device storing instructions that when executed by the one or more processors cause the one or more processors to perform operations including:
  generating a first obfuscated data unit corresponding to a first private data unit for the device;
  sending to a server the first obfuscated data unit;
  receiving from the server a combination of the first obfuscated data unit and a second obfuscated data unit corresponding to a second private data unit for a different device; and
  determining whether the first private data unit is equal to the second private data unit based on the combination;
  wherein each obfuscated data unit corresponding to each private data unit represents an obfuscation of a private vector unit corresponding to the private data unit based on a rotation mapping function and a random rotation angle; and
  wherein the first private data unit and the second private data unit represent one of similar locations, similar wealth, or similar scores upon determining the first private data unit is equal to the second private data unit.

22. The device of claim 21, wherein:
the operations further include:
  generating a first private vector unit corresponding to the first private data unit; and
  obfuscating the first private vector unit based on the rotation mapping function and the random rotation angle; and the combination comprises a dot product of the first and second obfuscated data units.

23. The device of claim 21, wherein:
the first private data unit and the second private data unit represent one of different locations, different wealth, or different scores upon determining the first private data unit is not equal to the second private data unit.

24. The device of claim 22, wherein:
obfuscating the first private vector unit comprises:
  generating a random vector unit that is perpendicular to the first private vector unit;
  generating the random rotation angle; and
  applying the rotation mapping function to the random vector unit to rotate the random vector unit by the random rotation angle to product a rotated vector unit, wherein the first obfuscated data unit comprises the rotated vector unit.

25. The device of claim 21, wherein:
each private vector unit is a real-valued vector.

26. The device of claim 21, wherein:
each private vector unit is an integer-valued vector.

27. A non-transitory computer-readable medium having instructions which when executed on a computer perform a method comprising:
  generating a first obfuscated data unit corresponding to a first private data unit for a first client device;
  sending to a server the first obfuscated data unit;
  receiving from the server a combination of the first obfuscated data unit and a second obfuscated data unit corresponding to a second private data unit for a second client device; and
  determining whether the first private data unit is equal to the second private data unit based on the combination;
  wherein each obfuscated data unit corresponding to each private data unit represents an obfuscation of a private vector unit corresponding to the private data unit based on a rotation mapping function and a random rotation angle; and
  wherein the first private data unit and the second private data unit represent one of similar locations, similar wealth, or similar scores upon determining the first private data unit is equal to the second private data unit.

28. The medium of claim 27, the method further comprising:
  generating a first private vector unit corresponding to the first private data unit; and
  obfuscating the first private vector unit based on the rotation mapping function and the random rotation angle;
  wherein obfuscating the first private vector unit comprises:
    generating a random vector unit that is perpendicular to the first private vector unit;
    generating the random rotation angle; and
    applying the rotation mapping function to the random vector unit to rotate the random vector unit by the random rotation angle to product a rotated vector unit;
  wherein the first obfuscated data unit comprises the rotated vector unit; and
  wherein the combination comprises a dot product of the first and second obfuscated data units.

* * * * *